(12) United States Patent
Strauss et al.

(10) Patent No.: US 8,881,052 B2
(45) Date of Patent: Nov. 4, 2014

(54) METHODS AND SYSTEMS FOR MANAGING WIDGETS THROUGH A WIDGET DOCK USER INTERFACE

(75) Inventors: Jonathan Strauss, Beverly Hills, CA (US); Marco Boerries, Los Altos Hills, CA (US); Arlo Rose, Mountain View, CA (US); Edward Voas, Mountain View, CA (US); Joseph Scott Derringer, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 683 days.

(21) Appl. No.: 11/689,477

(22) Filed: Mar. 21, 2007

(65) Prior Publication Data
US 2008/0235602 A1 Sep. 25, 2008

(51) Int. Cl.
G06F 3/048 (2013.01)
G06F 9/44 (2006.01)

(52) U.S. Cl.
CPC .................................. G06F 9/4443 (2013.01)
USPC ............................ 715/802; 715/762; 715/823

(58) Field of Classification Search
CPC . G06F 9/4443; G06F 3/0481; G06F 3/04817; G06F 11/324; H04N 21/4438; H04N 21/488; H04N 21/431; H04N 21/4886; H04N 21/4312
USPC ......................................... 715/762, 802, 823
See application file for complete search history.

(56) References Cited

U.S. PATENT DOCUMENTS

| | | | | |
|---|---|---|---|---|
| 6,345,358 B1 * | 2/2002 | Hall et al. | ........................ | 713/1 |
| 7,343,567 B2 * | 3/2008 | Mann et al. | ................... | 715/826 |
| 7,443,418 B2 * | 10/2008 | Bryant et al. | .............. | 348/207.1 |
| 7,503,010 B2 * | 3/2009 | Chaudhri et al. | ............. | 715/764 |
| 7,743,335 B2 * | 6/2010 | Rogers et al. | ................. | 715/764 |
| 7,743,336 B2 * | 6/2010 | Louch et al. | ................... | 715/766 |
| 7,823,071 B2 * | 10/2010 | Matthews et al. | ............. | 715/750 |
| 2002/0160817 A1 * | 10/2002 | Salmimaa et al. | ............ | 455/566 |
| 2003/0191736 A1 * | 10/2003 | Reid et al. | ......................... | 707/1 |
| 2005/0235332 A1 * | 10/2005 | Manson et al. | ................ | 725/110 |
| 2006/0277469 A1 * | 12/2006 | Chaudhri et al. | ............. | 715/709 |
| 2007/0118813 A1 * | 5/2007 | Forstall et al. | ............... | 715/805 |
| 2007/0130541 A1 * | 6/2007 | Louch et al. | .................. | 715/804 |
| 2007/0185183 A1 * | 8/2007 | Siegel et al. | ................. | 514/409 |
| 2007/0186183 A1 * | 8/2007 | Hudson, Jr. | ................... | 715/810 |
| 2007/0238077 A1 * | 10/2007 | Strachar | ........................ | 434/178 |
| 2008/0034314 A1 * | 2/2008 | Louch et al. | .................. | 715/778 |
| 2008/0034317 A1 * | 2/2008 | Fard et al. | ..................... | 715/781 |
| 2008/0034318 A1 * | 2/2008 | Louch et al. | .................. | 715/781 |
| 2008/0086689 A1 * | 4/2008 | Berkley et al. | ................ | 715/731 |

* cited by examiner

Primary Examiner — Amy Ng
Assistant Examiner — Andres E Gutierrez
(74) Attorney, Agent, or Firm — Martine Penilla Group, LLP

(57) ABSTRACT

Methods, systems and computer readable media defining computer instructions for rendering a user interface (UI) are provided. The UI is defined for handling a widget that provides functionality to a displayable and executable mini-application. The widget includes a plurality of widget attributes, including a dock tile that is defined to display only selected ones of the plurality of widget attributes of the widget. Also provided is a widget dock to display and contain the dock tile on a display screen, and the dock tile is linked by a functional association to the widget. The widget dock provides access to launch the widget when selection of the dock tile is detected, so as to provide full interface with the plurality of widget attributes of the widget.

23 Claims, 6 Drawing Sheets

METHODS AND SYSTEMS FOR MANAGING WIDGETS THROUGH A WIDGET DOCK USER INTERFACE

FIELD OF THE INVENTION

This invention generally relates to the desktop computing environment and particularly, but without limitation, to a system and user interface for organizing, controlling, and launching mini desktop applications.

BACKGROUND OF THE INVENTION

In a desktop computer system, a computer user interacts with the computing system through a user interface. In the current age of graphical user interface, the computer user normally launches a desired computing application by selecting (through clicking or double clicking) an application short-cut icon on the computer screen. The short-cut icon itself is generally passive and the application to which this icon corresponds to, does not provide any interface to the computer user unless the application is in running state.

If the computer user expects an application to provide a continuous visual or other type of feedback, the computer user is required to run the application and also to keep the application in the running state for the time the computer user desires to keep received the information from the application in question. Furthermore, the computer user will need to keep many applications running continuously if the computer user desires to accomplish tasks implemented in different applications. Doing so, however, will require more computing resources and the running applications will also take screen space requiring the computer user to switch the applications back and forth from background to foreground in order to obtain desired information.

This issue is addressed by the development of mini desktop applications. These mini desktop applications are generally lightweight and can be run by simply rendering them on the display screen. When rendered on the display screen, these mini desktop applications visually appear to be the same as the desktop short-cut icons. However, contrary to the desktop short-cut icon, the graphical icon or picture provided by the mini desktop is an active display of information. The difference between a normal desktop application corresponding to a desktop short-cut and a graphical icon or picture corresponding to a mini desktop application can be better illustrated by the following example. A normal desktop short-cut for a laptop battery state indicator will not continuously show the current state of the battery. Only way to get the battery state information is to launch the application. Whereas, a desktop icon or picture on the desktop corresponding to a battery state indicator mini application will continuously show the state of battery through changing information on the picture or icon, without a need to any user action.

These mini desktop applications are also called "widgets". The term "widget" can refer to any icon or graphical interface element that is manipulated by the computer user to perform a desired function.

A problem arises when the computer user tries to use several of these mini applications because putting too many of these mini applications on the computer user's display screen makes the display screen cluttered, thereby making the organization, management and use of these mini applications a cumbersome task.

SUMMARY

Broadly speaking, the present invention fills these needs by providing a widget dock to better manage widgets on the display screen, and provides a way for grouping the widgets, controlling other visual and functional aspects of the widgets, including controlling the widget engine, enabling a centralized access to the widgets and widget engine configurations and preferences, etc. It should be appreciated that the present invention can be implemented in numerous ways, including as a process, an apparatus, a system, a device or a method. Several inventive embodiments of the present invention are described below.

In one embodiment, a user interface (UI) is provided. The UI is defined for handling a widget that provides functionality to a displayable and executable mini-application. The widget includes a plurality of widget attributes, including a dock tile that is defined to display only selected ones of the plurality of widget attributes of the widget. Also provided is a widget dock to display and contain the dock tile on a display screen, and the dock tile is linked by a functional association to the widget. The widget dock provides access to launch the widget when selection of the dock tile is detected, so as to provide full interface with the plurality of widget attributes of the widget.

In another embodiment, a computer-implemented method for handling the widgets is provided. The method is defined to provide functionality to a displayable and executable mini-application. The widget includes a plurality of widget attributes. The computer-implemented method further includes displaying a widget dock to display and contain a dock tile on a display screen, and displaying the dock tile to display only selected ones of the plurality of widget attributes of the widget, and linking the dock tile by a functional association to the widget.

In yet another embodiment, a computer readable media having program instructions for executing a widget is provided. The widget includes a plurality of widget attributes. The computer readable media includes program instructions for rendering a widget dock displaying module to display a dock tile contained in a widget dock on a display screen. The computer readable media also includes program instructions for rendering a dock tile displaying module programmed to display only selected ones of the plurality of widget attributes of the widget, and program instructions for rendering a dock tile linking module to functionally associate the dock tile to the widget.

The advantages of the present invention are numerous. Most notably, the apparatus and methods described herein enable a computer user to properly handle, control, and manage thousands of available widgets. The embodiments of the present invention provide a way to group the widgets, control the visual aspects of the widgets, enable/disable through a unified interface. The disclosed embodiments also enable the computer user to launch the widget to allow access to the full widget interface, or, alternatively, run the widget in a limited functionality mode.

Other aspects and advantages of the present invention will become apparent from the following detailed description, taken in conjunction with the accompanying drawings, illustrating by way of example the principles of the present invention.

BRIEF DESCRIPTION OF DRAWINGS

The present invention will be readily understood by the following detailed description in conjunction with the accompanying drawings. To facilitate this description, like reference numerals designate like structural elements.

The figures are provided in order to provide a thorough understanding of the present invention. The figures should not be construed as limiting the breath of the invention in any manner.

DETAILED DESCRIPTION

An invention for a method and apparatus for handling the widgets using a widget dock is disclosed. In the following description, numerous specific details are set for the in order to provide a thorough understanding of the present invention. In one embodiment of the invention, a widget dock to better manage a plurality of widgets on the display screen is provided. In one aspect, the widget dock provides functionality to enable grouping of widgets, controlling other visual and functional aspects of the widgets (including controlling the widget engine), enabling a centralized access to the widgets, and widget engine configurations and preferences, etc. It will be understood, however, by one of ordinary skill in the art, that the present invention may be practiced without some or all of these specific details. In other instances, well known process operations have not been described in details in order not to unnecessarily obscure the present invention.

A widget is a graphics rich desktop application, which usually has a relatively small memory footprint. On the display screen, the widgets appear similar to application desktop icons. However, contrary to the desktop icons, the widgets when appearing on the display screen are in fact running applications. Furthermore, contrary to the application desktop icons, the user interface of the widgets is dynamic. For instance, the graphics or the information being displayed by the widget can change to show the desired information to the user. For example, a weather widget will show continuously changing temperature of a user selected city or zip code.

Because the user interfaces of the widgets are generally designed to occupy small display space on the display screen, a user may have many widgets running on the display screen simultaneously. This is a big advantage over normal conventional user applications (such as text editors, accounting applications etc.) in which the user interface is designed to cover either the whole display screen or at least a substantial space on the display screen.

There are hundreds or probably thousands of widgets available for download from the internet or other sources and the number of available widgets is growing rapidly. The embodiments of the present invention, among other things, address the issue of managing, grouping, and controlling a plurality of widgets, which may be used and displayed on a screen. With this overview in mind, the following figures will illustrate example structure, functionality and controlling interfaces to render and manage widgets through a widget dock.

Figure 1:
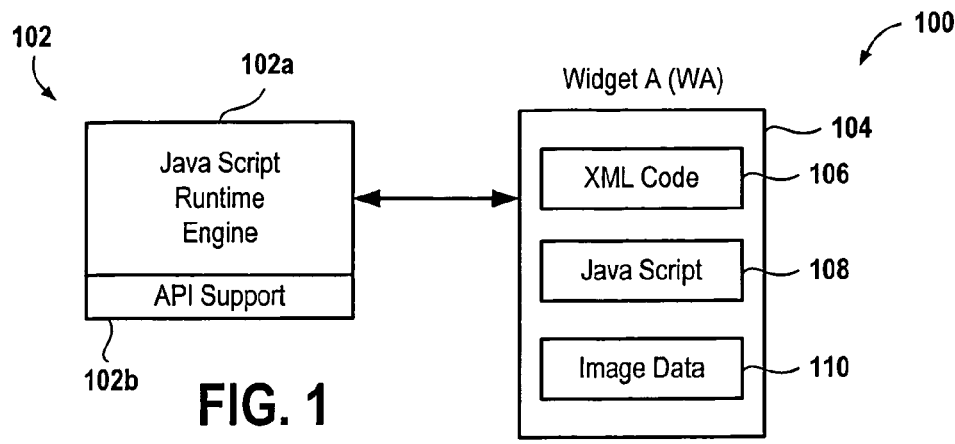
FIG. 1 illustrates a widget engine and a widget, in accordance with one embodiment of the present invention.

FIG. 1 illustrates a widget environment 100 and a widget engine 102. The widget environment 100 includes a widget 104 which includes XML code 106, JavaScript™ code 108, and image data 110. The widget engine 102 includes a JavaScript™ runtime engine 102a, which also includes an XML parsing and validation system. The JavaScript™ runtime engine 102a also provides API support 102b. The XML code 106 and JavaScript™ code 108 combined provides a specific functionality and behavior to the widget 104, whereas, the image data 110 provides a graphical user interface to the widget 104. JavaScript™ runtime engine 102a parses and executes the XML code 106 and JavaScript™ code 108 when the widget 104 is executed or run. The API support 102b allows the widget 104 to make use of the computing resources of the computer in which the widget 104 is running or executing. The API support 102b also allows the widget 104 to make use of the resources available in the network of computers or Internet. It may be noted that any ECMA (European Computer Manufacturers Association) compliant JavaScript™ may be used for coding.

In one embodiment, the API support 102b includes support for HTTP/HTTPS API, XML API, FTP API, Operating System native API, JAVA™/JavaScript™ programming language API, etc.

In one embodiment, a user interface (UI) is broadly defined as a graphical user interface that is capable of interfacing with functional code, displaying content and user interactivity, and providing feedback to users in view of the manipulations, commands, or user directed selections or input. Further, a UI, as rendered by a computing device, can display different types of graphical and non graphical objects. Example functionality can include displaying objects and allowing the objects to be moved, dragged, emailed, resized, minimized, maximized, and manipulated either programmatically or manually by the computer user.

Figure 2:
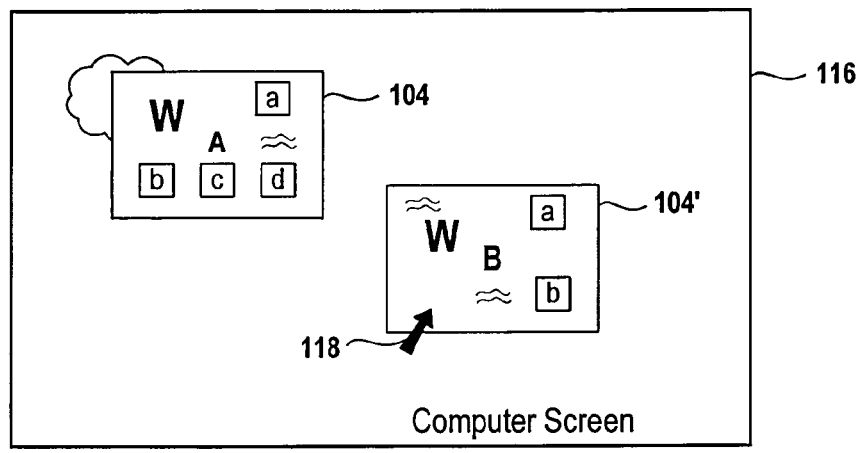
FIG. 2 illustrates widgets being displayed on a display screen, in accordance with one embodiment of the present invention.

FIG. 2 illustrates a display screen 116 and the widget 104 residing on the display screen. FIG. 2 also shows a mouse pointer 118 positioned on a widget 104. As apparent from FIG. 2, the widgets 104 visually appear to be normal application short-cuts. However, a widget 104 appearing on the display screen is not a passive icon; it is actually a running or executing application.

Figure 3:
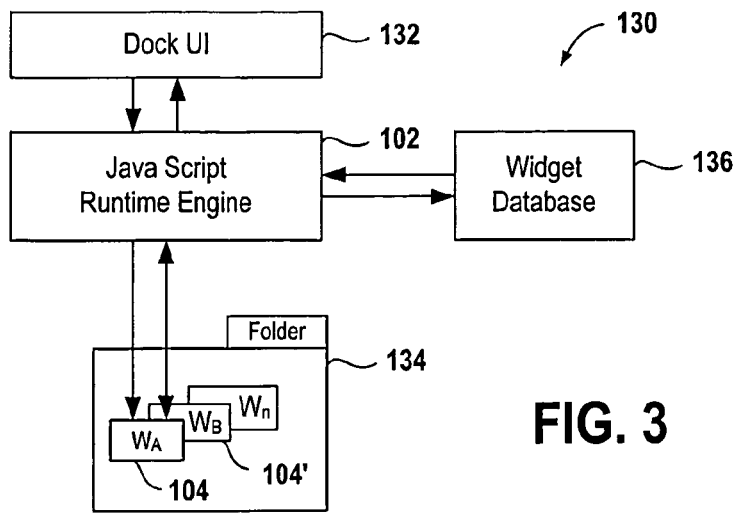
FIG. 3 illustrates a block diagram showing widget dock, Widget Engine, Widget database, widget store and their couplings, in accordance with one embodiment of the present invention.

FIG. 3 illustrates a dock system 130 including a widget dock user interface (UI) 132 in communication with the widget engine 102, a widget store 134, and a widget database 136. When the widget engine 102 and the widget dock UI 132 are started, widget dock UI 132, through the widget engine 102, queries the widget database to get a list of widget names, their corresponding icons, and the location of the widget code in the widget store 134. As will be described below, the widget dock UI 132 will enable the presentation of a widget dock that enables the presentation, management, and user access to widgets that may be loaded on a computing device.

Figure 4A:
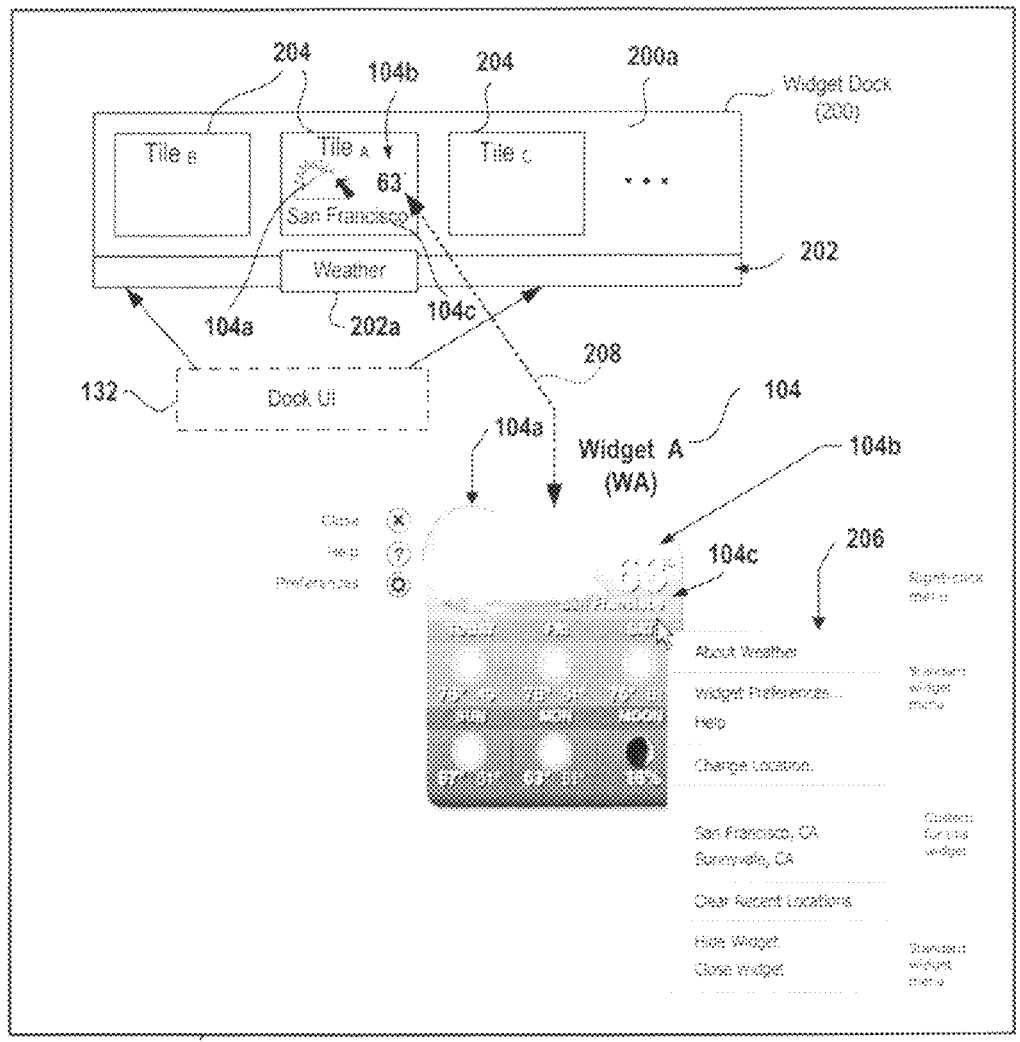
FIG. 4A illustrates a widget dock user interface (UI) including dock tiles and an exemplary widget user interface, in accordance with one embodiment of the present invention.

FIG. 4a illustrates the widget dock UI rendered on the display screen 116 and including a widget dock 200 and a dock bar 202. The widget dock 200 includes a dock tile display area 200a. The widget dock 200 displays dock tiles 204 and the dock bar 202 is used to display textual attributes 104c of the widget 104. The dock tile 204 is associated to a widget 104 through an association 208, which enables communication between the widget dock 200, the widget 104, and dock tile 204. The dock tile 204 displays the textual and graphical attributes of the associated widget 104. The widget 104 also includes a widget menu 206, which is rendered when the computer user desires to make any changes to the configuration of the widget 104, to change author defined preferences, to close or hide the widget 104, or to make any changes in the information contained in one or more widget attributes.

In one embodiment, the widget menu 206 can be modified or extended to add more preference or configuration features. The widget menu 206 is configurable to enable easy navigation and interface to the configuration options provided by the widget 104. For example, in the exemplary weather widget 104 in FIG. 4a, the widget menu 206 enabled a computer user to change the name of the city to get the weather information of that particular city. Also, because the dock tile 204 is associated to the widget 104, if the information change is made to a widget attribute, which is also rendered on the dock tile 204, the information change will also be reflected on the graphical user interface of the dock tile 204.

In one embodiment, the shape of the widget dock 200 is rectangular. The width, height, colors, and visual effects are configurable by the computer user. In another embodiment, the width, height, colors, and visual effects are set to default values. These default values, however may be adjusted. In a specific embodiment, the widget dock 200 will retain the width, height, colors, and visual effects until changed by the computer user. In yet another embodiment, the widget dock 200 takes any shape (for example—circular or convoluted) or size so long as the widget dock 200 is able to contain and display the dock tiles 204.

In one embodiment, the shape of the dock tile 204 is rectangular. In another embodiment, the shape of the dock tile 204 is square. In yet another embodiment, the shape of the dock tile 204 is circular or convoluted. In yet another embodiment, the shape of the dock tile 204 is any shape of any size so long as the dock tile 204 is capable of being displayed and contained within the widget dock 200.

In one embodiment, the widget dock 200 and the dock tile 204 are displayed on the display screen 116 in the color scheme selected by the computer user. In another embodiment, a default color scheme may be used. In yet another embodiment, the widget dock 200 and the dock tile 204 are displayed in any color or in a combination of colors so long as the graphical rendering of the widget dock 200 and the dock tile 204 is visible on the display screen 116, when programmed to be visible.

In one embodiment, a plurality of dock tiles 204 contained in the widget dock 200 are arranged in an alphabetical order by the name of the widgets 104. In another embodiment, the dock tiles 204 are arranged by a selected and enabled preference. In yet another embodiment, the dock tiles 204 are arranged by the functional categorization or by the importance of the functionality to the computer user. In yet another embodiment, the dock tiles 204 are arranged by a computer user selected scheme so long as the dock tiles 204 are capable of being arranged within the widget dock 200.

Figure 4B:
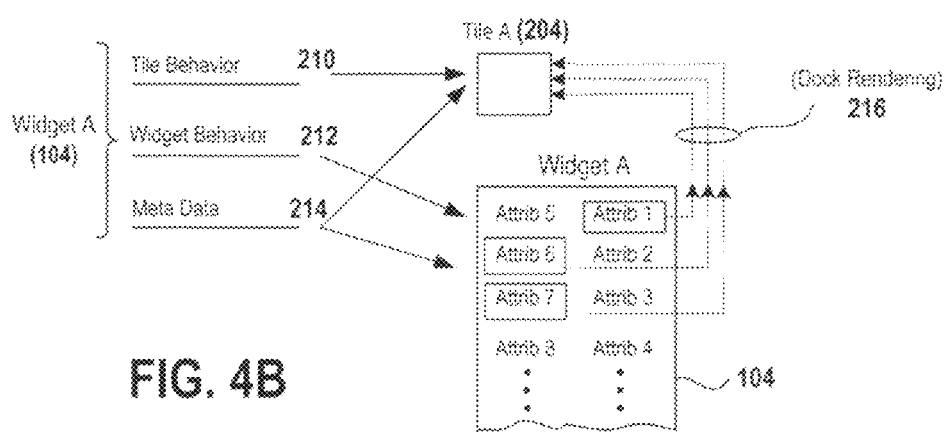
FIG. 4B illustrates attribute structure of a widget and dock rendering, in accordance with one embodiment of the present invention.

FIG. 4b illustrates an internal functional structure of a widget 104 and a functional relationship of the widget 104 with a dock tile 204. The widget 104, through XML code 106, JavaScript™ code 108, and image data 110, provides a tile behavior 210, a widget behavior 212 and metadata 214. In one embodiment, the widget 104 can include one or more widget attributes. In another embodiment, one or more widget attributes are associated with a widget function (for example: a calculator widget in which the result attribute is associated with the user inputs). By way of example, the widget attributes can be programmed through XML code 106 and JavaScript™ code 108, and image data 110. Other programming structures and languages can also be used to define the widget attributes, so long as the widget attributes are displayable, selectable, and function as intended.

In one embodiment, the author of the widget 104 has full control on programming the tile behavior 210, the widget behavior 212, and the metadata 214. In one embodiment, the metadata 214 includes a version number of the widget 104, name of the widget 104, etc. In another embodiment, the metadata 214 includes widget identification attributes, name of the author, name of the authoring firm, copyright notices, etc.

In one embodiment, at the time of loading a dock tile 204, the widget dock 200 requests the widget 104 to provide the tile behavior 210. The tile behavior 210 includes a subset of the widget attributes. In one example, the tile behavior 210 is passed to the widget dock 200 through a dock rendering 216 process. The dock rendering 216 process includes selecting one of more widget attributed from the plurality of the widget attributes of the widget 104.

FIG. 4a also illustrates an exemplary widget, such as weather widget 104. The weather widget 104 as illustrated in FIG. 4a shows a plurality of exemplary widget attributes. These exemplary widget attributes include a picture of clouds 104a, a temperature 104b and name of a city 104c.

In the exemplary widget 104 illustrated in FIG. 4a, the exemplary widget attributes e.g. the picture of the cloud 104a, the temperature 104b, and the name of the city 104c, are the parts of the tile behavior 210. The information contained in these attribute is transmitted to the dock tile 204 through widget association 208 through the dock rendering 216. This information so passed to the dock tile 204 is then displayed by the dock tile 204 docked in the widget dock 200.

In one embodiment, the tile behavior 210 includes selected ones of the plurality of the widget attributes. The widget attributes included in the tile behavior 210 data are used to be displayed on the dock tile 204. As illustrated in FIG. 4a, the picture of the cloud 104a, the temperature 104b, and the name of the city 104c are being displayed both by the widget 104 and the dock tile 204. In another embodiment, the tile behavior 210 includes selected ones of the plurality of the widget attributes and one or more attributes that are not a part of the widget attributes.

The widget behavior 212 refers to the behavior of the widget 104 when the widget 104 is rendered on the display screen 116. In one embodiment, an author of the widget 104 writes the XML code 106, JavaScript™ code 108, and image data 110 to enable the widget 104 to accomplish one or more author defined tasks. For example, the weather widget 104 shows, and continuously updates (e.g., cycles through), current weather conditions including the temperature 104b of a selected city 104c. Thus, selected ones of the tile behavior 210 is cycled through, so that certain attributes are displayed in the dock tile 204 during some period of time, and then it automatically changes to a next attribute for another period of time, and so on.

Figure 5:
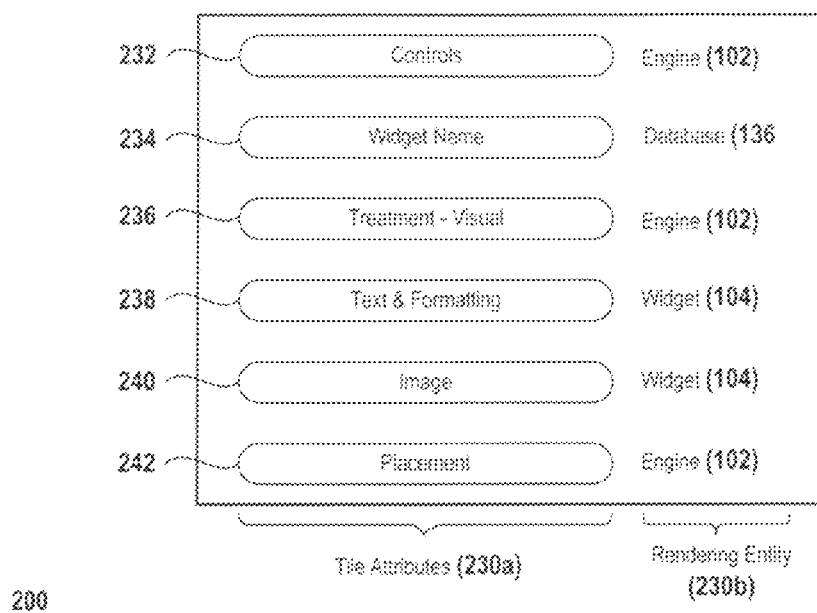
FIG. 5 illustrates an internal functional structure of a dock tile showing tile attributes and respective rendering entities, in accordance with one embodiment of the present invention.

FIG. 5 illustrates functional layers 230 that control one or more functional and visual aspects of the dock tiles 204. FIG. 5 also illustrates a mapping between the tile attributes 230a and their rendering entities 230b. In one embodiment, the functional layers include controls 232, widget name 234, visual treatment 236, text & formatting 238, image 24, and placement 242 functions.

The controls 232 are rendered by the widget engine 102. The controls 232 provide an interface to control the behavior of the dock tile 204. The controls 232 are also used to set dock tile 204, widget 104 and widget engine 102 preferences. Display and functional characteristics such as activating/inactivating are also controlled by the controls 232.

The dock tile 204 is identified by its associated widget 104 name. Widget name 234 is rendered by the widget database 136. The widget database 136 includes the name of the widgets 104. The widget database 136 provides the name of the widget 104 to the widget dock 200 when a dock tile 204 associated with the widget 104 is added to the widget dock 200.

The Treatment-Visual 236 is a functionality built into the dock tile 204 which controls the visual aspects of the dock tile 204 in different situations such as when a mouse pointer 118 is detected on the dock tile 204 or when the dock tile 204 is active/inactive etc. The Treatment-Visual functionality is rendered to the dock tile 204 by the widget engine 102.

The Text & Formatting 238 functionality is rendered by the widget 104. The Text and formatting functionality refers to a capability of the dock tile 204 to display the information contained in the widget attributes selected to be rendered on the dock tile 204.

The Image 240 functionality controls the graphical image displayed on the dock tile 204 by the widget 104. The widget 104 defines what image is to be rendered on the dock tile 204. It may be noted that text & formatting and image combined constitute the tile behavior 210 of the dock tile 204.

The Placement 242 function refers to the location of the dock tile 204 in the widget dock 200. The Placement 242 of the dock tile 204 is controlled or managed by the widget engine 102. In one embodiment, the dock tiles 204 are arranged alphabetically by the name of the widget 104.

In another embodiment, the arrangement of the dock tiles 204 is configured in the widget engine 102 configuration. The widget engine 102 provides dock tiles 204 in a particular sequence as configured by either the computer user, or the author of the engine. In yet another embodiment, the sequence of the dock tiles 204 is set to a default scheme by the author of the engine, or the computer user.

Figures 6A, 6B:
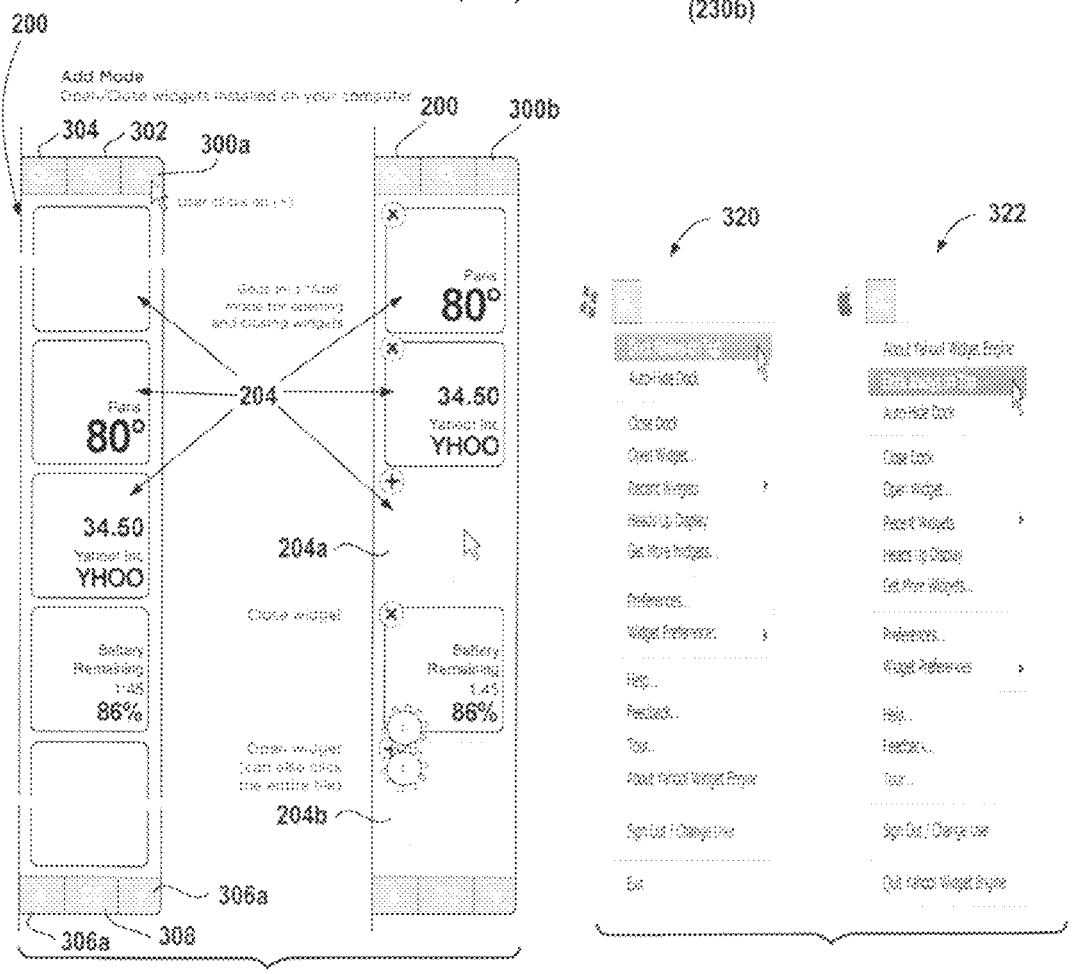
FIG. 6A illustrates a dock tile showing menus/control buttons, scroll buttons and active and inactive dock tiles, in accordance with one embodiment of the present invention.
FIG. 6B illustrates 2 different embodiments of a control menu, in accordance with one embodiment of the present invention.

FIG. 6a illustrates the widget dock 200 in a vertical alignment, containing a plurality of dock tiles 204, a control menu button 304, a search button 302, a show all button 300a, a show active button 300b, up-down scroll buttons 306a, and a heads up display button 308. FIG. 6a also illustrates the dock tiles 204 in two states, active and inactive. FIG. 6a also illustrates a dock tile 204a to which the associated widget 104 has not provided the tile behavior 210 data.

In another embodiment, the alignment of the widget dock 200, placement of the controls on the widget dock 200, text and menu display, and the shapes and sizes of the dock tiles 204 are settable by preferences. In yet another embodiment, the alignment of the widget dock 200, placement of the controls on the widget dock 200, text and menu display and the shapes and sizes of the dock tiles 204 are set to default values by the widget 104 author. As used therein, "author" means a programmer, designer, company, or combination thereof, that define the coding, functionality and appearance of the widget 104.

The show all button 300a is visible when the widget dock 200 is displaying only the active dock tiles 204. In one embodiment, an active dock tile 204 is a dock tile 204 which is not marked as a hidden dock tile 204. In another embodiment, an active dock tile 204 is a dock tile 204 whose associated widget 104 is currently in active state. In yet another embodiment, an active dock tile 204 is a dock tile 204 whose associated widget 104 is currently being displayed on the display screen 116.

When the show all button 300a is clicked, in one embodiment, the widget dock 200 starts showing all the dock tiles 204, both active and inactive, loaded in the widget dock 200. Then, the show all button 300a is replaced by the show active button 300b, which when clicked causes the widget dock 200 to display only active dock tiles 204.

The heads up display button 308, in one embodiment, when clicked or selected through a keyboard action, makes all the objects (e.g., displayed interfaces of running applications, shortcut icons, etc.) except the widgets 104 on the display screen 116 and the widget dock 200, hidden on the display screen 116. In this embodiment, by hiding every visual object on the display screen, except the widgets 104 and widget dock 200, the computer user may have a unobstructed view of the placement of various widgets 104 on the display screen 116.

The search button 302 when click or selected in some other way, such as through a keyboard shortcut key, in one embodiment, launches a search window for searching a text string in the world wide web (e.g., internet) and in a network of connected computers. In another embodiment, the search button 302 is configured to provide other search functionalities such as searching in the local storages for different object types, or, searching using different types of tools or search engines. In yet another embodiment, the computer user configures the search functionality to be invoked when the search button 302 is clicked.

When, as a part of the tile behavior 210, the widget 104 does not provide an image for displaying by the widget dock 200 on the dock tile 204, in one embodiment, the widget engine 102 tries to locate an appropriate image for this dock tile 204 from a widget catalog which includes the metadata of the widgets 104'. The widget metadata may include name of the widget 104, name or other type of identification of the author, screenshots of the widgets 104', user ratings, user comments, widget images, widgets 104' download links, etc. In one embodiment, a cryptographic hash function such as message digest algorithm 5 (MD5) is used to match the widget 104 metadata in the catalog for the purpose of retrieving the dock tile 204 appropriate image. In another embodiment, a cryptographic hash function may be used for finding and retrieving of widget 104 metadata such as the rating of the widget 104 by other users of the widget 104, user comments, etc. If no appropriate image is found, a default image is displayed by the dock tile 204. In another embodiment, the computer user selects an appropriate image for the dock tile 204. In yet another embodiment, a default tile behavior 210 is set into the widget dock 200 and used to display the dock tile 204 when the widget 104 does not provide the tile behavior 210.

As illustrated by FIG. 6a, in one embodiment, an inactive dock tile 204 shows a '+' sign in one of the corner, which when clicked activates the dock tile 204. Similarly, the active dock tile 204 shows an 'x' sign in one of the corner, which when clicked makes the dock tile 204 inactive. In another embodiment, different icons are used instead of '+' and 'x'. In one embodiment, these buttons are only visible when the mouse pointer 118 is brought over or near the dock tile 204. In another embodiment, the computer user, through user preferences, controls the visibility, location and what task to initiate when a particular button is clicked or selected.

FIG. 6b illustrates a control menu 320 in one embodiment. The control menu 320 provides the computer user an access to the widget dock 200 configuration, widget dock 200 preferences, widget engine 102 preferences and controls, widget preferences and other functionality pertinent to handling and management of the widget dock 200 and the widget 104. In another embodiment, other control tasks, user defined configurations, and user preferences that are pertinent to the handling and managing of the widget dock 200 and the widget engine 102 are also shown in the control menu 320.

Figure 6C:
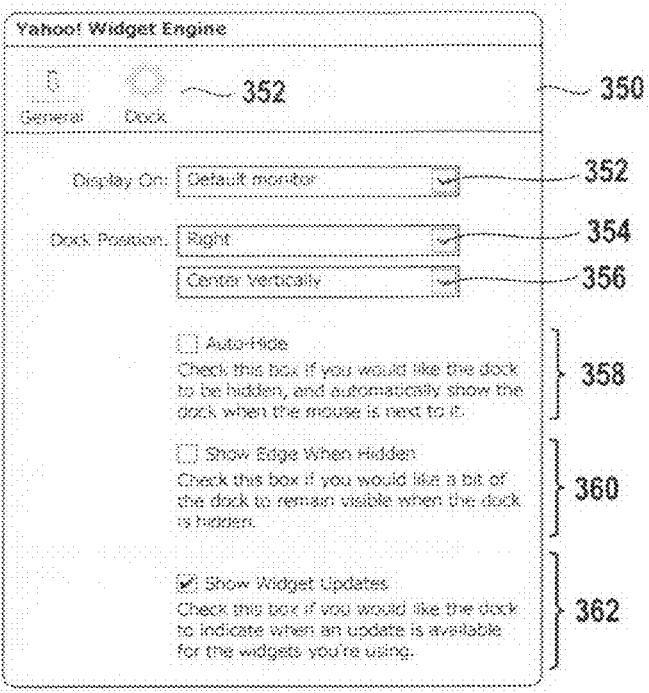
FIG. 6C illustrates a dock settings dialog box, in accordance with one embodiment of the present invention.

FIG. 6c illustrates a dock settings dialog box 350. The dock settings dialog 350 is implemented to show different information in different sizes, color, and using different controls in different embodiments. In one embodiment, a display monitor selection 352 is used select the display screen 116 when there are more than one monitors or display screens 116 are connected to the computer.

A horizontal align selection 354 is used to select a horizontal alignment of the widget dock 200. In one embodiment, the horizontal alignment is set to one of these values "right", "left", "center". In another embodiment, the horizontal alignment is set to any position between the left perimeter edge and the right perimeter edge of the display screen 116. In yet another embodiment, the widget dock 200 is set to float freely and the computer user can move the widget dock 200 to any position on the display screen 116.

A vertical align selection 356 is used to select a vertical alignment of the widget dock 200. In one embodiment, the vertical alignment is set to one of these values "center", "top", "bottom". In another embodiment, the vertical alignment is set to any position between the top perimeter edge and bottom perimeter edge of the display screen 116. In yet another embodiment, the widget dock 200 is set to float freely and the computer user can move the widget dock 200 to any position on the display screen 116. In yet another embodiment, the widget dock 200 is displayed in a diagonal alignment. In the diagonal alignment, the widget dock 200 is displayed in any position between horizontal alignment and vertical alignment.

FIG. 6C also illustrates an auto-hide check box 358, a show edge when hidden check box 360, and a show widget updates check box 362. It should be noted that there is no limitation as to how many controls or configuration options may be included in the dock settings dialog 350.

In one embodiment, the auto-hide check box 360 is used to control the display characteristics of the widget dock 200. When the auto-hide check box is checked, the widget dock 200 is set to hide until the mouse pointer 118 is next to the widget dock 200.

In one embodiment, when the display characteristics of the widget dock 200 are changed from hidden to a visible state, the widget dock 200 remains visible for a set period of time when the mouse pointer 118 is moved away from the widget dock 200. In another embodiment, when the display characteristics of the widget dock 200 are changed from hidden to a visible state, the widget dock 200 is set to hide without a wait.

In one embodiment, a show edge when hidden check box 360 is used to control the visual aspects of the widget dock. When this box is checked, a bit of the widget dock 200 remains visible when the full interface of the widget dock 200 is set to hide.

In one embodiment, a show widget updates check box 362 is used to instruct the widget dock 200 to check for the updates that may be available for the displayed or non-displayed widget 104 in a catalog of widgets 104'. When this check box is checked, as illustrated in FIG. 6, the dock tile displays a visual indicator which enables the user to install widget updates.

Figure 7:
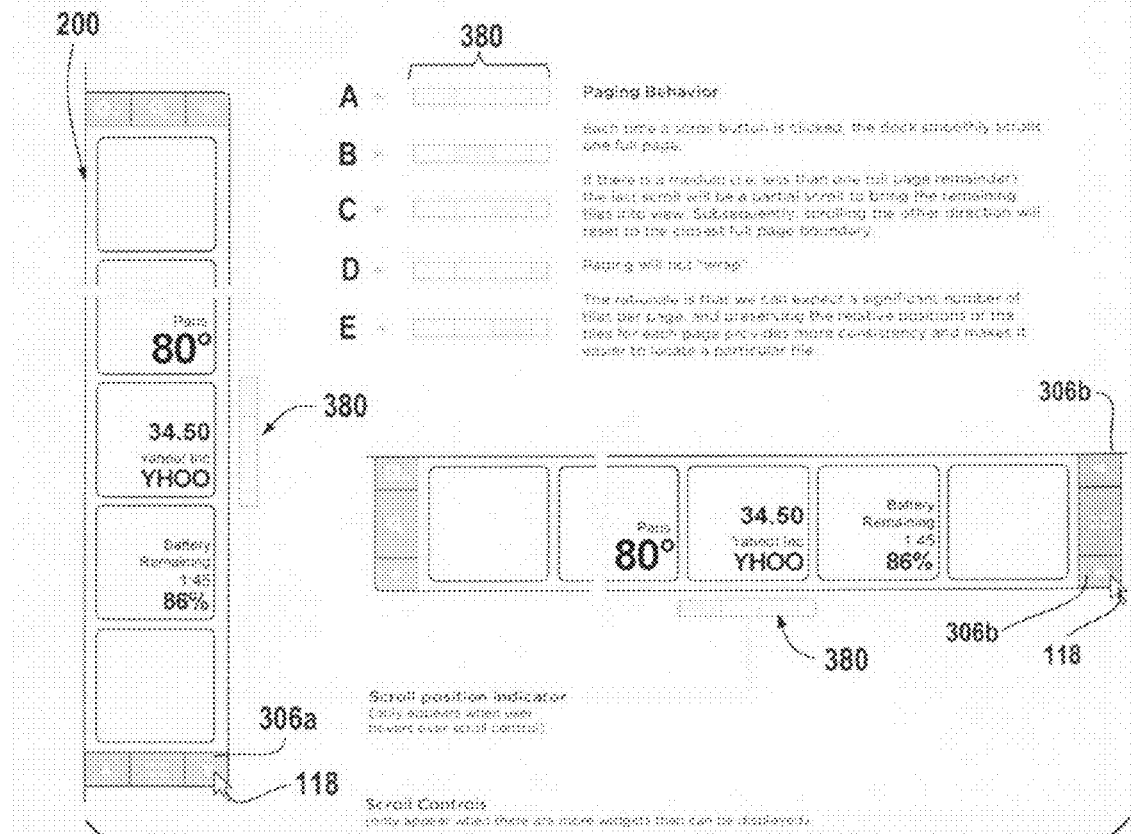
FIG. 7 illustrates a page location indicator to indicate relative location of displayed dock tiles vis-a-vis all dock tiles in the widget dock, in accordance with one embodiment of the present invention.

FIG. 7 illustrates a widget dock 200 in a vertically aligned position in one embodiment, and the widget dock 200 in a horizontally aligned position in another embodiment. FIG. 7 also illustrates a page location indicator 380 in different positions.

In one embodiment in which the widget dock 200 is of rectangular shape, and the size or dimensions of the widget dock is insufficient to show all the dock tiles 204 contained in the widget dock 200, the widget dock 200 shows scroll button 306a. In one embodiment, the scroll button 306a can be selected using a mouse pointer 118. In another embodiment, keyboard keys or mouse wheel are used to control the scrolling of the dock tiles 204 in the widget dock 200.

The dock tiles 204 contained and displayed in the widget dock 200 are grouped into pages where one page contains a number of dock tiles 204 equal to the number of dock tiles 204 which can be displayed by the widget dock 200 in its current size. For example, if the widget dock 200 is showing five dock tiles, a page would contain five tiles; hence, in the widget dock 200 contains 20 dock tiles 204, the widget dock 200 would have four pages.

As the size of the page is linked to the size of the widget dock display area 200a, increasing or reducing the size of the widget dock display area 200a results in a respective increase or decrease in the size of the page.

In one embodiment, the page contains only active dock tiles 204. In another embodiment, the page contains both active and inactive dock tiles 204. In yet another embodiment, the page contains dock tiles 204 which have active associated widgets 104 on the display screen 116. In yet another embodiment, the page contains a mix of active and inactive dock tiles 204 as preferred by the computer user.

In one embodiment, the page location indicator 380 is displayed along the widget dock 200 perimeter edges. The location of the page location indicator 380 is set by a user preference. The page location indicator 380 is made visible when the mouse pointer 118 is hovered over the scroll button 306a.

In another embodiment, the widget dock 200 is horizontally aligned and located in the lower half of the display screen 116. The location of the page location indicator 380 is alongside of the upper perimeter edge of the widget dock 200. In yet another embodiment, the widget dock 200 is vertically aligned and located in the left half of the display screen 116. The location of the page location indicator 380 is alongside of the right perimeter edge of the widget dock 200.

In yet another embodiment, the widget dock 200 is vertically aligned and located in the right half of the display screen 116. The location of the page location indicator 380 is alongside of the left perimeter edge of the widget dock 200. In one embodiment, the center of the location of the page location indicator 380 aligns with the center of the widget dock 200. In another embodiment, the center of the location of the page location indicator 380 does not align with the center of the widget dock 200.

In one embodiment, the page location indicator 380 is permanently displayed alongside the widget dock 200. In another embodiment, the page location indicator 380 is made visible on the display screen 116 only when the number of pages exceeds one. In yet another embodiment, the page location indicator 380 display characteristics are set by a user preference.

In one embodiment, the scroll button 306*a* is made visible only when there are more widget tiles 204 than can be displayed by the widget dock 200. In another embodiment, the scroll button 306*a* is permanently visible on the widget dock 200. In yet another embodiment, the scroll button 306*a* display characteristics are set by a user preference.

In one embodiment, the page location indicator 380 is rectangular in size. In another embodiment, the page location indicator 380 could take any size or shape so long as the page location indicator 380 is able to show the location of displayed page with respect to other pages in the widget dock 200.

In one embodiment, the page location indicator 380 will dynamically change to show blocks 380A equal to number of pages and a partial block to indicate less than a page. In one embodiment, each time a scroll button is clicked, the widget dock 200 scrolls one full page 380B in the direction of the scroll. In another embodiment, keyboard keys or scroll mouse wheel are used for scrolling.

In one embodiment, if there is a less than one full page remainder, the last scroll will be a partial scroll to bring the remaining dock tiles 204 into view 380C. Subsequently, scrolling to the other direction will reset to the closest full page boundary.

In one embodiment, the paging does not wrap 380D, 380E. Preserving the relative positions of the dock tiles 204 for each page provides more consistency and makes it easier to locate a particular dock tile 204. In another embodiment, the paging wraps when there is a less than one full page remainder.

Figure 8:
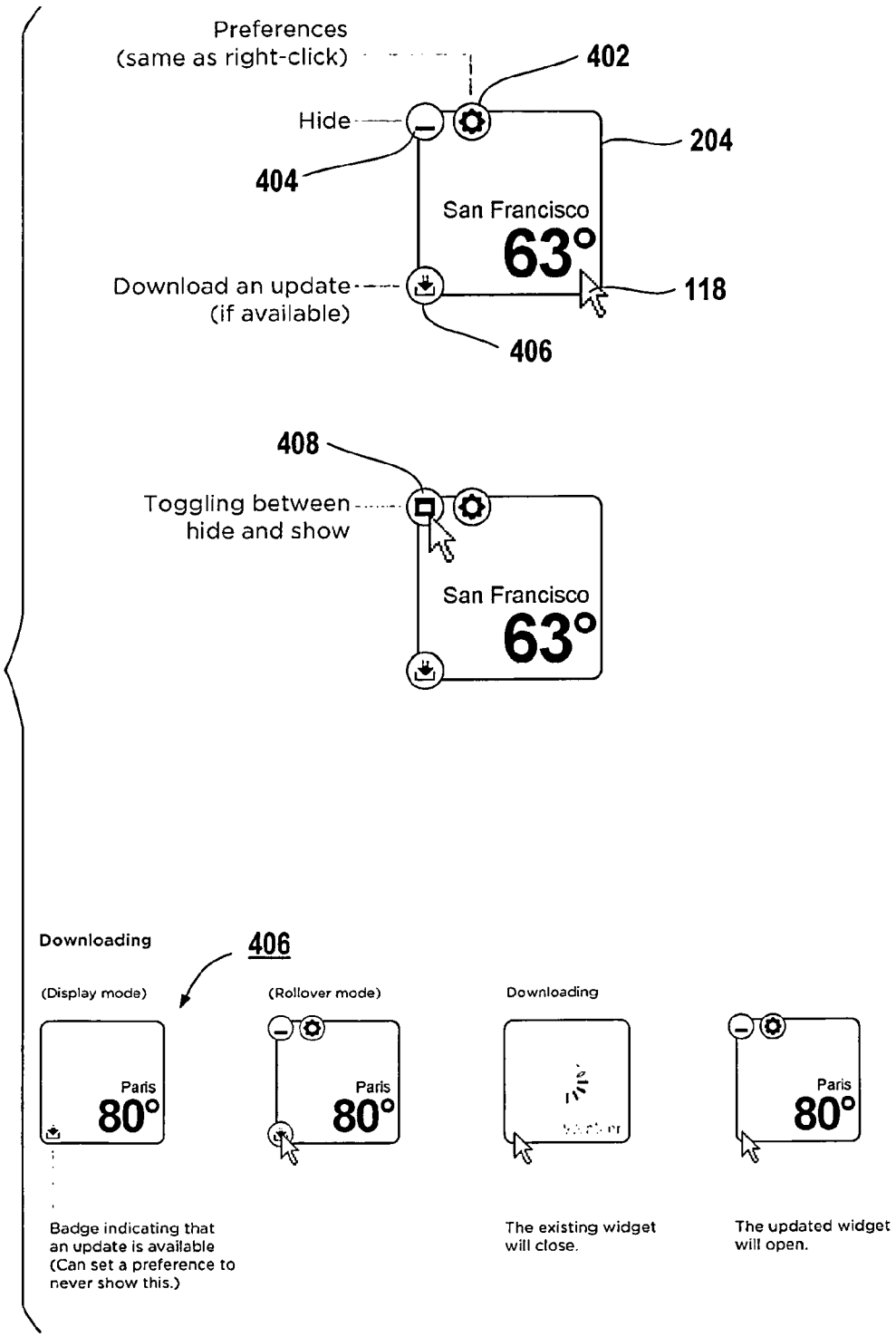
FIG. 8 illustrates various controls and buttons on a dock tile.

FIG. 8 illustrates a dock tile 204 showing a preferences button 402, a hide tile button 404, a download update button 406, and a show tile button 408. The icons, shapes of the buttons, shape of the dock tile 204, and the contents as shown in the figure are for illustration purpose only. The icons, shapes of the buttons, shape of the dock tile 204, and the contents may be different in different embodiments.

In one embodiment, the preferences button 402, the hide tile button 404, the download update button 406, and the show tile button 408 are only visible when the mouse pointer 118 is brought over the dock tile 204.

In another embodiment, display properties of the preferences button 402, the hide tile button 404, the download update button 406, and the show tile button 408 are set by a user preference.

In one embodiment, the hide tile button 402 is used to hide the dock tile 204 without unloading associated widget 104. The space occupied by this hidden dock tile 204 in the dock tile display area 200*a* remains intact but the dock tile 204 does not show the widget attributes. In another embodiment, the hide tile button 402 is used to hide the widget 104 on the display screen 116. When the widget 104 is so hidden, in one embodiment, its associated dock tile 204 continues to show the widget attributes. In another embodiment, when the mouse pointer 118 is brought over the associated dock tile 204, the dock tile 204 shows the widget attributes for the duration the mouse pointer 118 is over or near the dock tile 204.

In one embodiment, the show tile button 408 is used to change the state of the dock tile 204 from hidden to visible. In another embodiment, the show tile button 408 is used to change the state of the dock tile 204 from inactive to active. In yet another embodiment, a functionality to uninstall the widget 104 from the computer (i.e. remove the widget 104 from the widget store 134) may be provided through a button or a menu control on the dock tile 204. Moreover, a button or a menu control may also be provided to show the location of the widget store 134 in user's computer.

The widget engine 102 monitors the provider of the widget 104 for an updated widget 104. In one embodiment, the download update button 406 is shown on the dock tile 204 if an updated associated widget 104 is available at the widget provider location. In another embodiment, the widget engine 102 downloads an updated widget 104 from the widget provider location and shows the download update button 406. In one example, the version of the widget 104 is checked against the latest available widget 104 at the widget provider location or at widget catalog using a scheme of unique identifiers coded into the widget 104. When the download update button 406 is clicked or selected through any other user action, the widget 104 is closed; the updated widget 104 is downloaded and launched. The dock tile 204 corresponding to the updated widget 104 is displayed in the widget dock 200.

Figure 9:
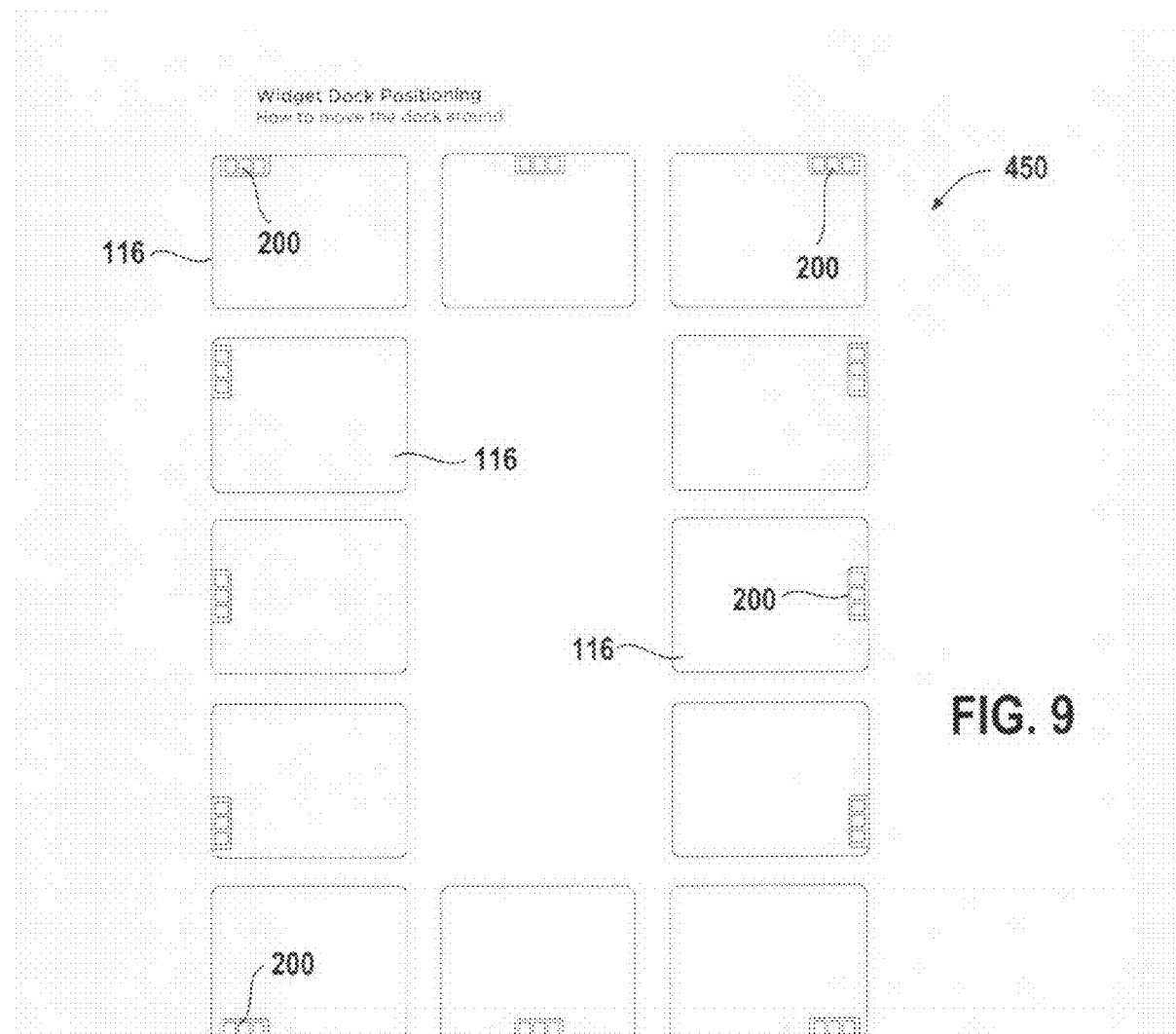
FIG. 9 illustrates positions for the widget dock, in accordance with one embodiment of the present invention

FIG. 9 illustrates a widget dock positioning location 450. In one embodiment, the widget dock 200 is aligned along perimeter edges of the display screen 116. In another embodiment, the widget dock 200 is set to be displayed at any location on the display screen 116.

Figure 10:
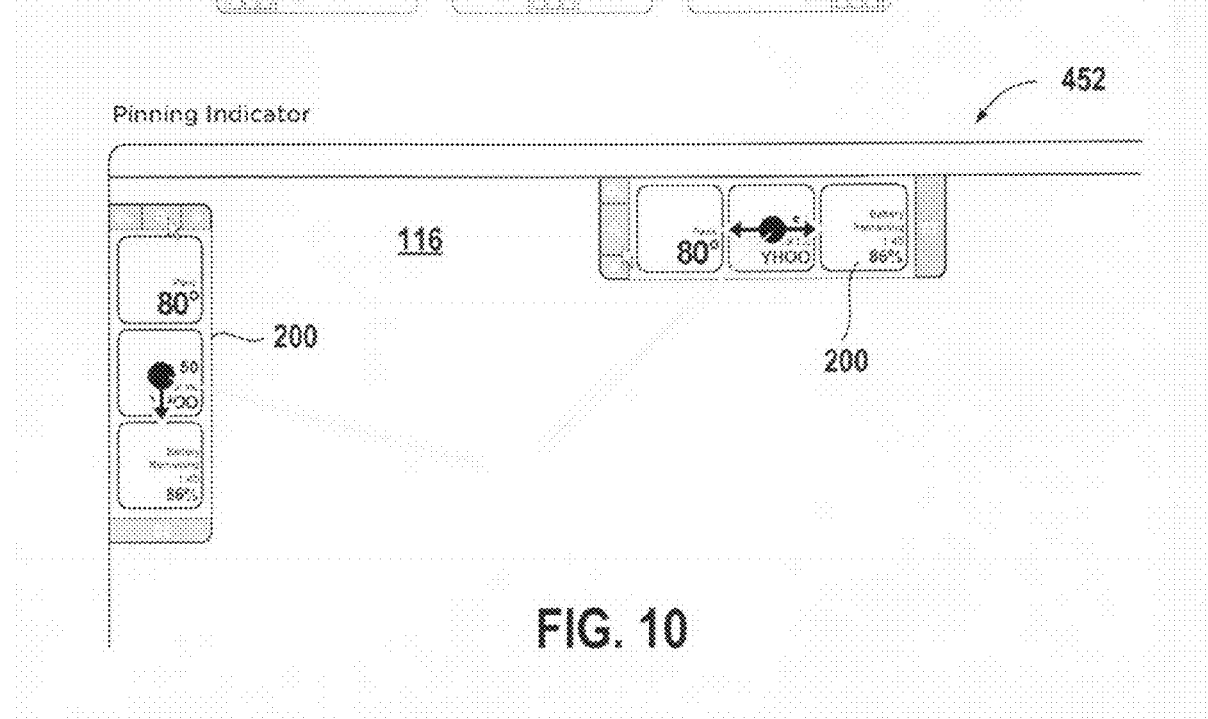
FIG. 10 illustrates various places on the display screen where the widget dock could be rendered and pinned, in accordance with one embodiment of the present invention.

FIG. 10 illustrates a pinning indicator 452. The pinning indicator 452 is used to enable dragging of the widget dock 200 to any location on the display screen 116 on the display screen and pin or freeze the widget dock 200 in that location so that it stays and opens at that location until these settings are changed. In another embodiment, the widget dock 200 is set to open, when launched, in a user defined location on the display screen 116.

In one embodiment, the widget dock 200 and associated functionality is implemented through various programming modules containing programming instructions to accomplish one or more tasks. The major programming modules in one embodiment of the invention are as follows.

A computer implementation for displaying the widget dock 200 is accomplished by programming a widget dock displaying module. The widget dock displaying module, when executed, reads widget dock 200 configuration files and displays the widget dock 200 on the display screen 116 according to the configuration. The widget dock displaying module also enable displaying of the dock tiles 204 in the widget dock display area 200*a* and associating the dock tiles 204 to their respective widgets 104. The widget dock displaying module also enables the widget dock 200 to display dock tiles 204 within the widget dock display area 200*a*.

The widget dock displaying module is in communication with a dock tile display module. The dock tile display module is programmed to display the dock tiles in the widget dock display area 200*a*. The dock tile display module also receives the tile behavior 210 data of the widget 104 from the widget engine 102. The dock tile display module displays the widget attributes included in the tile behavior 210 on the dock tile 204.

The dock tile display module is in communication with a dock tile linking module. The dock tile linking module is programmed to functionally associate a dock tile 204 to a widget 104.

The dock tile display module is coupled to a widget launching module. The widget launching module is programmed to provided a full interface of the widget 104 when selection of the dock tile 204 is detected.

The widget dock display module is coupled to a widget dock interfacing module. The widget dock interfacing module is programmed to interface functionally a widget dock 200 with the widget engine 102. The widget engine 102 is defined to execute programming instructions that enable rendering of the widget 104 and the dock tile 204.

The widget dock display module is also coupled to a dock bar display module. The dock bar display module is programmed to display a dock bar 202 alongside the widget dock 200. The dock bar 202 displays widget name identification 202a of a particular one of the dock tiles 204 when user interactivity with the particular one of the dock tiles 204 is detected.

The widget dock display module is coupled to a widget dock positioning module the widget dock positioning module is programmed to display the widget dock 200 at a user, author, or system defined location on the display screen 116.

The widget dock display module is also coupled to a plurality of programming modules are provided for configuration, customization, and resizing of the widget dock 200. Furthermore, the widget dock display module is in communication with a plurality of programming modules for displaying of menus and buttons. The widget dock display module enables the widget dock 200 to perform a desired task when a particular button or a menu item is selected by the computer user.

In one embodiment, a seamless interaction between the widget dock 200 and with the network including internet is provided. The widget dock 200 is closely integrated with the widget catalog or gallery database which includes robust metadata of the thousands of widgets 104' submitted to the widget catalog or gallery by the authors or distributors of the widgets 104'. The metadata includes the name, the name of the author, screenshots, brief description, detailed description, user ratings, user comments, etc. of the widget 104. The widget dock 200 tracks and detects an update in the metadata in the widget catalog or gallery with the help of a cryptographic hash function such as message digest algorithm 5 (MD5). When a change in the metadata for the widget 104 or a new version of widget 104 is detected in the widget catalog or gallery, the widget 104 is dynamically synchronized with the updated information downloaded from the widget catalog or gallery. A unique identifier is coded in the widgets 104' to keep records of updates across versions. The close integration of the widget dock 200 with the internet and other network resources allows dynamical synchronization of the values of widget attributes when the values being rendered by these widget attributes change and the change is reflected in one or more network resources connected or integrated with the widget dock 200.

In one embodiment, the programming instructions to implement the widget dock 200 functionality are implemented in JAVA™ programming language, JavaScript™ programming language, and XML. In another embodiment, C++, C, C#, Visual Basic, JavaScript™, PHP, XML, HTML etc. are used to implement the widget dock 200. Commonly available application programming interface (API) such as HTTP API, XML API and parsers etc. are used in the implementation of the programming modules. In yet another embodiment, a computer programming language suitable for suitable for desktop software development is used.

In one embodiment, the widget dock 200 and related functionality is implemented on Microsoft Windows™ operating system. In another embodiment, the widget dock 200 and related functionality is implemented on Apple Mac™ operating system. In yet another embodiment, the widget dock 200 and related functionality is implemented on Linux operating system. In yet another embodiment, the widget dock 200 and related functionality is implemented on a desktop operating system which provides support for a graphical display screen.

The programming modules and ancillary software components, including configuration files, setup files required for installing the widget dock, are stored on a computer readable medium. Any computer medium such as a flash drive, a CD-ROM disk, an optical disk, a floppy disk, a hard drive, a shared drive, and storage suitable for providing downloads from connected computers, could be used for storing the programming modules.

The invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices.

While this invention has been described in terms of several preferable embodiments, it will be appreciated that those skilled in the art upon reading the specifications and studying the drawings will realize various alternation, additions, permutations and equivalents thereof. It is therefore intended that the present invention includes all such alterations, additions, permutations, and equivalents as fall within the true spirit and scope of the invention.

What is claimed is:

1. A system for handling a widget that provides functionality to a displayable and executable mini-application, the widget including a plurality of widget attributes, the system comprising:
   a memory device; and
   a processor display device coupled to the memory device, the processor display device for generating and displaying a user interface (UI), the UI including:
   a dock tile defined to display selected ones of the plurality of widget attributes of the widget, wherein the dock tile displays a predefined tile behavior that defines which of the selected ones of the plurality of widget attributes of the widget will be displayed during a cycle of time, wherein the selected attributes are less in number compared to the attributes of the widget, wherein the dock tile includes a portion of the executable mini-application; and a widget dock to display and contain a plurality of the dock tiles on a display screen of the processor display device, and the dock tile being linked by a functional association to the widget, the widget dock displaying the selected ones of the plurality of widget attributes of the widget during the cycle of time, the cycle of time during which the displaying occurs is continuous when the dock tile is active and is contained in the widget dock, wherein the plurality of said dock tiles are displayed in the widget dock and each is arranged in a row only along a perimeter edge of the display screen, wherein each of said docket tiles being of a same size;

widget dock controls arranged adjacent to the dock tile contained in the widget dock, the dock tile being an outermost dock tile of the plurality of dock tiles, and the widget dock controls, being arranged adjacent to the dock tile, remains in the row;

activate or inactivate control indicators for display over the dock tile of the plurality of dock tiles when a pointer is detected to be placed over the dock tile;

wherein the widget dock provides access to launch the widget when selection of the dock tile is detected so as to provide full interface with the plurality of widget attributes of the widget;

wherein the dock tile and the widget dock are each executed by a processor.

2. The system for handling a widget as recited in claim 1, wherein the UI is functionally interfaced with a widget engine, the widget engine defined to execute code that enables rendering of the widget and the dock tile.

3. The system for handling a widget as recited in claim 1, further comprising a scroll button integrated with the widget dock as part of the widget dock controls to control scrolling of said plurality of dock tiles when a dock tile display area is insufficient to display the plurality of dock tiles at one time, and further including a paging indicator being displayable on the display screen to indicate positional scrolling of the dock tiles in response to interaction with the scroll button of the widget dock.

4. The system for handling a widget as recited in claim 2, further comprising a control menu button defined on the widget dock to enable launching of a control menu for interfacing with the widget engine and the widget, the control menu button being part of the widget dock controls.

5. The system for handling a widget as recited in claim 2, further comprising:
   system components being interfaced with the UI, the system components including,
   the widget engine,
   a widget database, and
   a widget store.

6. The system for handling a widget as recited in claim 1, further comprising:
   a dock bar being graphically displayed alongside the widget dock, the dock bar providing widget name identification of the dock tile when user interactivity with the dock tile is detected, and wherein user interactivity with the dock tile is detected when selection of the dock tile causes the launching of the widget.

7. The system for handling a widget as recited in claim 1, wherein the widget dock includes positioning functionality, the positioning functionality enabling the widget dock to be graphically placed and displayed at selected user defined locations on the display screen.

8. The system for handling a widget as recited in claim 5, wherein the dock tile is defined by functional layers that control aspects of the dock tile when displayed on the widget dock, the functional layers include,
   a position function controlled by the widget engine;
   an image function controlled by the widget;
   a text and formatting function controlled by the widget;
   a treatment function controlled by the widget engine;
   a widget name function controlled by the widget database; and
   a controls function controlled by the widget engine.

9. The system for handling a widget as recited in claim 8, wherein the position function controlled by the widget engine defines a place for the dock tile in the widget dock.

10. The system for handling a widget as recited in claim 8, wherein the image function controlled by the widget defines graphics to be displayed by the dock tile.

11. The system for handling a widget as recited in claim 8, wherein the text and formatting function controlled by the widget defines a text and a formatting of the selected ones of the plurality of widget attributes of the widget to be displayed by the dock tile.

12. The system for handling a widget as recited in claim 8, wherein the treatment function controlled by the widget engine defines a visual tile behavior, for the dock tile in the widget dock, including the dock tile visualization when the widget is enabled and the dock tile visualization when the widget is not enabled, wherein the visual tile behavior cycles through one or more attributes over time when the dock tile is enabled in the widget dock.

13. The system for handling a widget as recited in claim 8, wherein the widget name function controlled by the widget database provides a widget name identification of the dock tile when user interactivity with the dock tile is detected.

14. The system for handling a widget as recited in claim 8, wherein the controls function controlled by the widget engine defines a place, a shape, and a functionality to control buttons on the dock tile in the widget dock.

15. A computer-implemented method for handling a widget that provides functionality to a displayable and executable mini-application, the widget including a plurality of widget attributes, the computer-implemented method comprising:
   displaying a widget dock to display and contain a plurality of dock tiles on a display screen, wherein the plurality of said dock tiles are each arranged in one row along a perimeter edge of the display screen, wherein each of said docket tiles being of a same size;
   displaying the plurality of dock tiles, each defined to display selected ones of the plurality of widget attributes of the widget, wherein the dock tiles display a predefined tile behavior that defines which of the selected ones of the plurality of widget attributes of the widget will be displayed during a cycle of time that is continuous when the dock tiles are active and are contained in the widget dock, wherein the selected attributes are less in number compared to the attributes of the widget, wherein each of the dock tiles includes a portion of the executable mini-application;
   displaying widget dock controls arranged adjacent to one dock tile contained in the widget dock, the one dock tile being an outermost dock tile of the plurality of dock tiles, and the widget dock controls, being arranged adjacent to the one dock tile, remains in the row;

displaying activate or inactivate control indicators over the one dock tile when a pointer is detected to be placed over the one dock tile; and linking the dock tiles to a functional association to the widget;

wherein the method is executed by a processor.

16. The computer-implemented method as recited in claim 15, further comprising enabling launching the widget when selection of the one dock tile is detected so as to provide full interface with the plurality of widget attributes of the widget.

17. The computer-implemented method as recited in claim 15, further comprising interfacing functionally the widget dock with a widget engine, the widget engine defined to execute code that enables rendering of the widget and the dock tiles, and further comprising launching a control menu for interfacing with the widget engine and the widget.

18. The computer-implemented method as recited in claim 15, further comprising graphically displaying a dock bar alongside the widget dock, the dock bar providing widget name identification of the one dock tile when user interactivity with the particular one of the dock tiles is detected.

19. The computer-implemented method as recited in claim 15, further comprising causing the widget dock to be graphically placed and displayed at selected user defined locations on the display screen.

20. The system for handling a widget as recited in claim 1, wherein the widget dock controls arranged adjacent to the dock tile are contained in a control bar that has a width that is about a width of the dock tile.

21. The computer-implemented method as recited in claim 15, wherein the widget dock controls arranged adjacent to the one dock tile are contained in a control bar that has a width that is about a width of the one dock tile.

22. The system for handling a widget as recited in claim 20, wherein the control bar includes one of a search control, a menu control, a show all control, or a scroll control.

23. The computer-implemented method as recited in claim 21, wherein the control bar includes one of a search control, a menu control, a show all control, or a scroll control.

* * * * *